March 15, 1955     H. O. KRON ET AL     2,703,991
HAND AND POWER OPERATED VALVE CONTROLS
Filed May 27, 1954     3 Sheets-Sheet 1
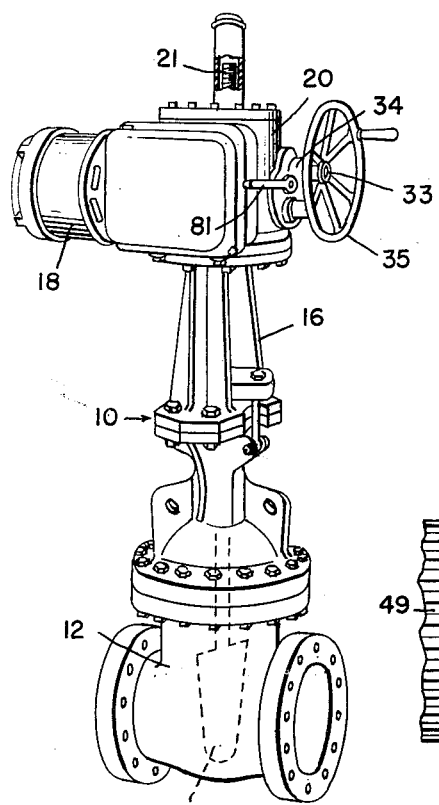
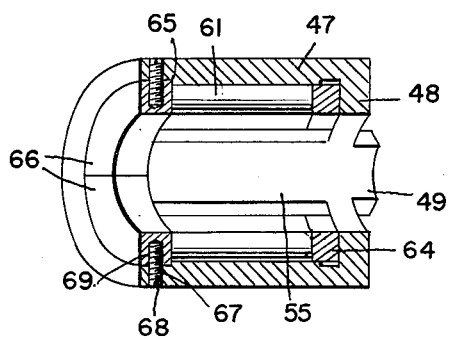
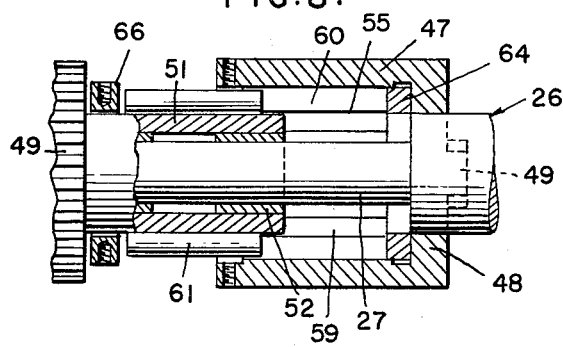
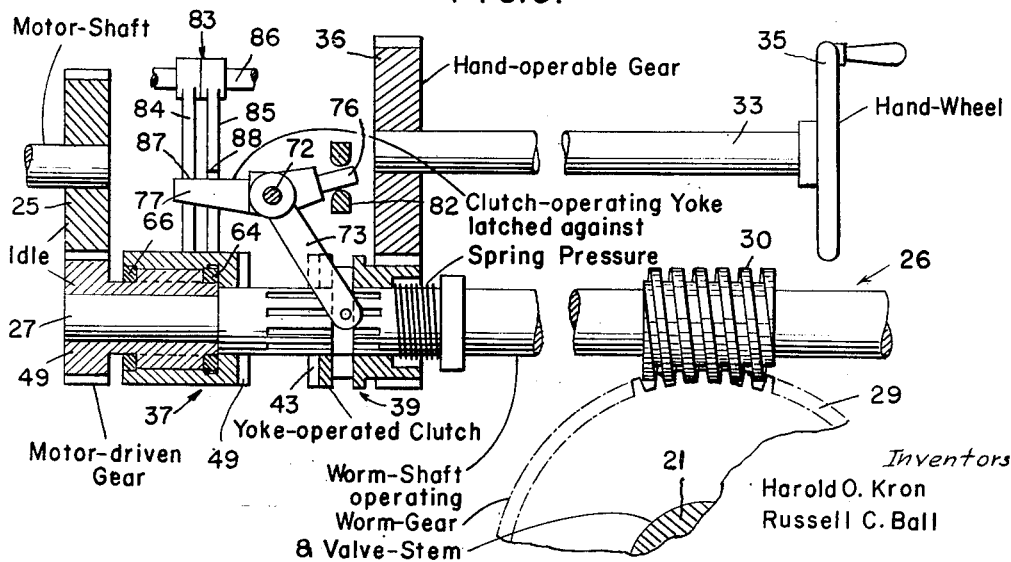
Inventors
Harold O. Kron
Russell C. Ball
By Arthur Middleton
ATTY.

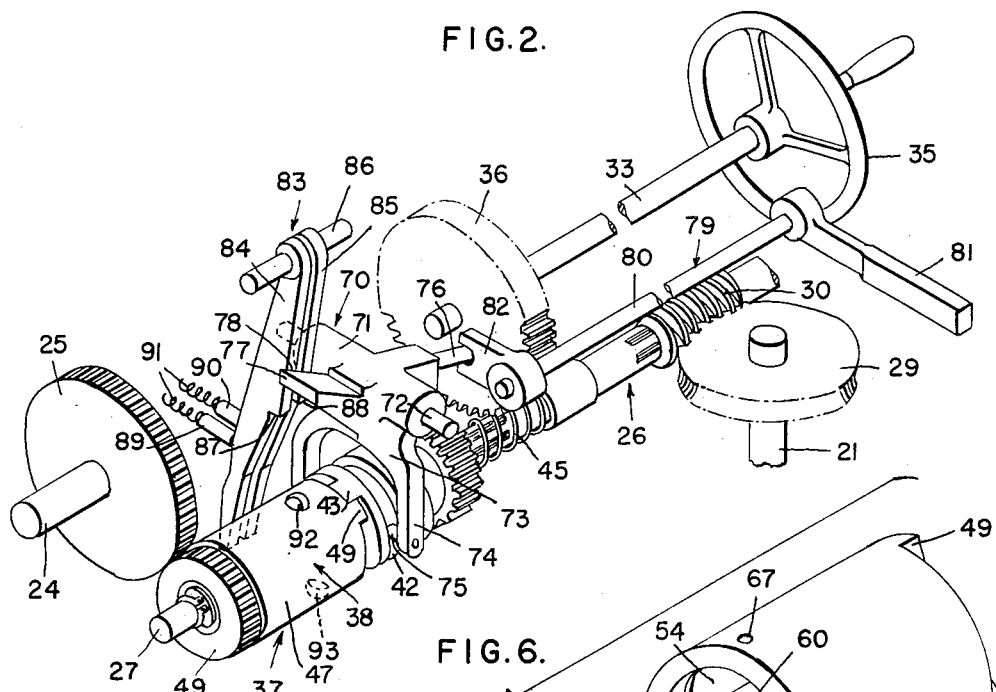
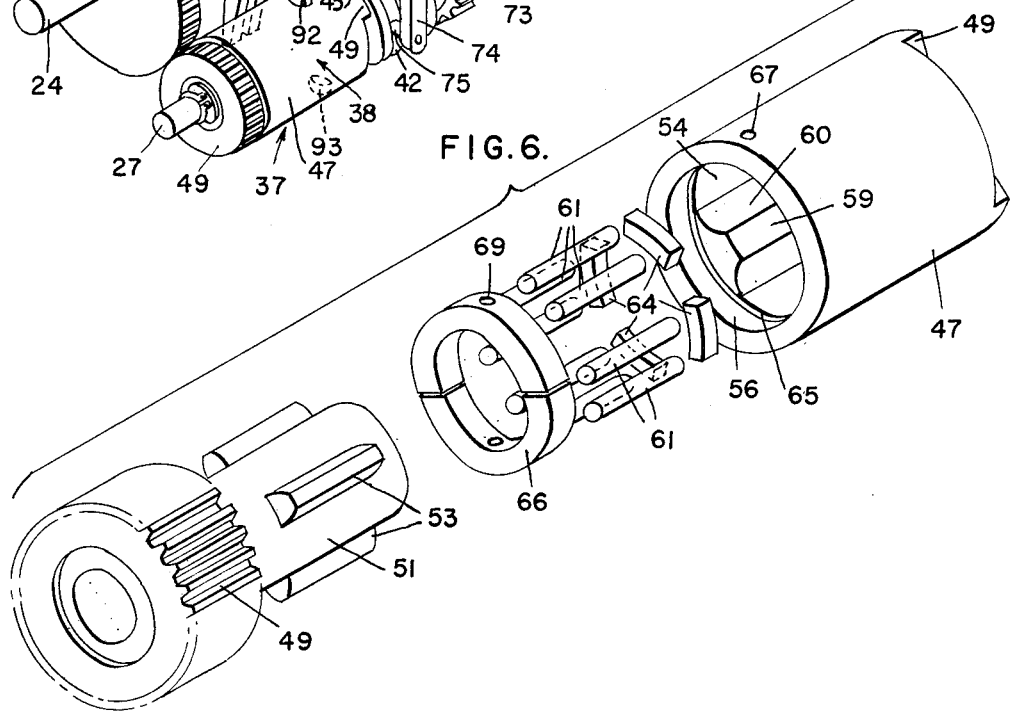

March 15, 1955  H. O. KRON ET AL  2,703,991
HAND AND POWER OPERATED VALVE CONTROLS
Filed May 27, 1954  3 Sheets-Sheet 3

Inventors
Harold O. Kron
Russell C. Ball

By Arthur Middleton
ATTY.

United States Patent Office 2,703,991
Patented Mar. 15, 1955

2,703,991

HAND AND POWER OPERATED VALVE CONTROLS

Harold O. Kron, Philadelphia, and Russell C. Ball, Wynnewood, Pa., assignors to Philadelphia Gear Works, Inc., Philadelphia, Pa., a corporation of Pennsylvania Application May 27, 1954, Serial No. 432,658

10 Claims. (Cl. 74—625)

This invention relates generally to dual valve operators of the type to be electively either motor driven or hand operated and more particularly to manually operable declutching of the valve stem operating mechanism to permit hand operation of the valve stem, while simultaneously rendering inoperative the connection between the motor drive and valve stem.

An example of the type of valve control to which the present invention pertains is shown in the patent to Ball, No. 2,114,013 and in the copending application of Harold O. Kron, Serial No. 306,347, certain new and novel improvements over this patented structure are disclosed and the present application is directed to certain novel improvements over the structure disclosed in the copending application.

In Patent 2,114,013 means is provided for elective operation of the valve stem to open and close the valve, by motor driven operation and by hand operation. When the motor drive is in effect, hand operation is disconnected and when hand operation is in effect, the motor drive is disconnected. If, however, the motor drive should be energized while the hand operation is in effect, the latter is immediately disconnected so the hand operator will not be injured. The motor drive is normally connected at all times so it is required that the operator manually disconnect the motor drive by moving a lever before he can operate the valve stem by hand.

In the disclosure of the patent in question, the valve stem is motor operated by a rotatable valve stem clutching worm gear which has meshing with it a worm on a motor driven shaft. When the valve stem is to be hand operated, the operator moves a lever to declutch the worm gear from the valve stem and clutch the hand wheel to the valve stem. When the parts are in proper relation for hand operation, a clutch operating yoke is locked in such position by means of two levers straddling the worm shaft. These levers are each pivoted at one end and their free extremities form a latch for the yoke. These levers are pivotally unlatched by means of a cam on the rotating cam shaft coming into contact with the levers at their intermediate section.

In the copending application of Harold O. Kron above identified there are set forth numerous new and novel features constituting improvements over the structure disclosed in the above referred to patent.

In the copending application of Harold O. Kron, there is provided a drive mechanism for a worm gear operated valve stem which is thereby opened and closed due to rotation of a shaft having a worm which coacts with the worm gear, with that worm shaft normally rotated by a motor drive having a reciprocable clutch member between it and the worm shaft but which can be declutched by a hand operated lever that at the same time clutches to the worm shaft a manually operable hand wheel on a shaft parallel to the worm shaft. Restarting of the motor drive automatically declutches the hand wheel from the worm shaft and reclutches the motor drive with that shaft. The clutch member is slidably operated by a rockable yoke having a lateral extension adapted to be latched in hand operable position by extension engaging notches on the intermediate section of each of two spring-loaded free-ended levers both pendently suspended at one side of the worm shaft and adapted to be unlatched by pivotal movement thereof against the spring load by contact with the free ends of the levers, one at a time in sequence, of means rotated by the motor drive. Spring pressure effective upon the yoke returns the hand operated lever to initial position and the motor drive is thus reconnected. Rotatable with the hand wheel is a gear positioned to have meshed and unmeshed with it a gear slidable on the worm shaft and spring pressed against the reciprocable clutch member, so that movement of the clutch member toward the rotatable gear on the hand wheel shaft brings about such meshing and return movement of the clutch member brings about such unmeshing. This same spring also spring loads the clutch operating yoke through the reciprocable clutch member against which the spring bears, so that when the unmeshing takes place the yoke and the hand operated lever return to initial position.

The novel features of the copending application of Harold O. Kron which comprise improvements over the patented structure are comprised in the structure of the present application.

This application has for a particular object to provide certain additional novel features in combination with the structure of the copending application of Harold O. Kron whereby certain desirable advantages are attained in connection with the operation thereof.

As hereinbefore stated, in the operation of the mechanism, restarting of the motor drive automatically declutches the hand wheel from the worm shaft and reclutches the motor drive with that shaft. Since the motor has attained a considerable speed in the interval between the shifting of the movable clutch element to disengage the hand wheel from the worm shaft to clutching engagement with the motor driven element, the clutch teeth of the motor driven element are traveling at an extremely high speed. Accordingly, when the rotating and non-rotating teeth of the two clutch elements come into mating engagement a considerable shock ensues which creates noise and also may result in breakage of parts.

It is accordingly an object of the present invention to provide a novel means in mechanism of this character for absorbing the shock incident to the engagement of the clutch members when the mechanism functions to establish a driving connection between the operating motor and the worm shaft which is operatively connected with the valve stem.

It is another object of the invention to provide an improved clutch mechanism which not only functions to absorb shock but which also functions to reduce the impact noise incident to the shifting and coupling together of the parts.

A further and more specific object of the invention is to provide in a valve operator of the character stated a new and novel shock absorbing and noise reducing clutch mechanism of relatively simple construction which may be assembled and installed with a minimum of effort.

The foregoing objects and possibly others, are attained by the provision of a driving element and a driven element mounted upon the worm shaft through which power is transmitted to the valve stem, the driving element being freely rotatable on the shaft and the driven element being secured on the shaft for non-rotative movement but adapted to have sliding or longitudinal movement for clutching and unclutching engagement with the drive element.

The drive element comprises a barrel body through which the worm shaft extends axially. One end of this body is formed with an inturned or inwardly directed flange which closely encircles the shaft and on the flanged end clutch teeth are carried for engagement by corresponding teeth carried by the adjacent driven element.

Within the barrel are a plurality of longitudinally extending grooves separated by lands having transversely curved longitudinal faces.

A gear receiving driving power from the operating motor has an elongate hub sleeve which extends into the barrel through the end remote from the clutch teeth and carries on its outer surface a plurality of longitudinally extending spacer ribs each of which is designed to position centrally between two adjacent lands and each of which is in cross section of a configuration corresponding to that of a spur gear tooth.

The outer surface of each rib is slightly transversely curved and lies in close proximity to the surface of the barrel between the lands and the transversely curved faces of the lands engage against or are in closely spaced relation with the surface of the hub sleeve.

The width of the space between adjacent lands is materially greater than the width of the spacer rib therein and disposed along opposite sides of each spacer rib in the space between each rib and the adjacent surface of a land, are rolls or cylinders of resilient material such as rubber, preferably synthetic or neoprene rubber. These resilient rolls or cylinders are of approximately the same length as the ribs and the end of the barrel remote from the clutch teeth carried thereby, is closed by a collar encircling the hub sleeve, which retains the resilient rolls or cylinders in position against longitudinal movement. The lands in the barrel join at their inner ends with the flange but terminate at their opposite or outer ends short of the end of the barrel which is closed by the collar and while the inner end of the gear hub sleeve extends into the barrel to the inner side or face of the flange, the spacer ribs carried thereon terminate short of the end of the hub sleeve and arcuate inserts are carried upon the inner end of the hub sleeve across the ends of the spacer ribs and across the adjacent ends of the resilient rolls or cylinders to cooperate with the collar at the opposite ends of the spacer ribs to maintain the resilient rolls in place.

The invention will be best understood from a consideration of the following detailed description taken in connection with the accompanying drawings forming a part of the specification, with the understanding that changes and modifications may be made in the structure within the scope of the appended claims.

The preferred embodiment of the invention is shown in the accompanying drawings, wherein:

Fig. 1 is a perspective view of the entire valve structure and control mechanism assembled.

Fig. 2 is a detailed perspective view on an enlarged scale of the manually operable declutching and valve stem operating mechanism incorporating the features of the present invention.

Fig. 6 is an exploded perspective view of the driving clutch element.

Fig. 7 is a longitudinal sectional view in perspective of the barrel assembly of the driving clutch element.

Fig. 8 is a view partly in longitudinal section and partly in elevation of the driving clutch unit showing the manner of assembling the same.

Fig. 9 is a vertical sectional partial but rather diagrammatic view illustrating the assembled relation of the clutch mechanism with the worm shaft and adjacent cooperating elements.

Figure 3:
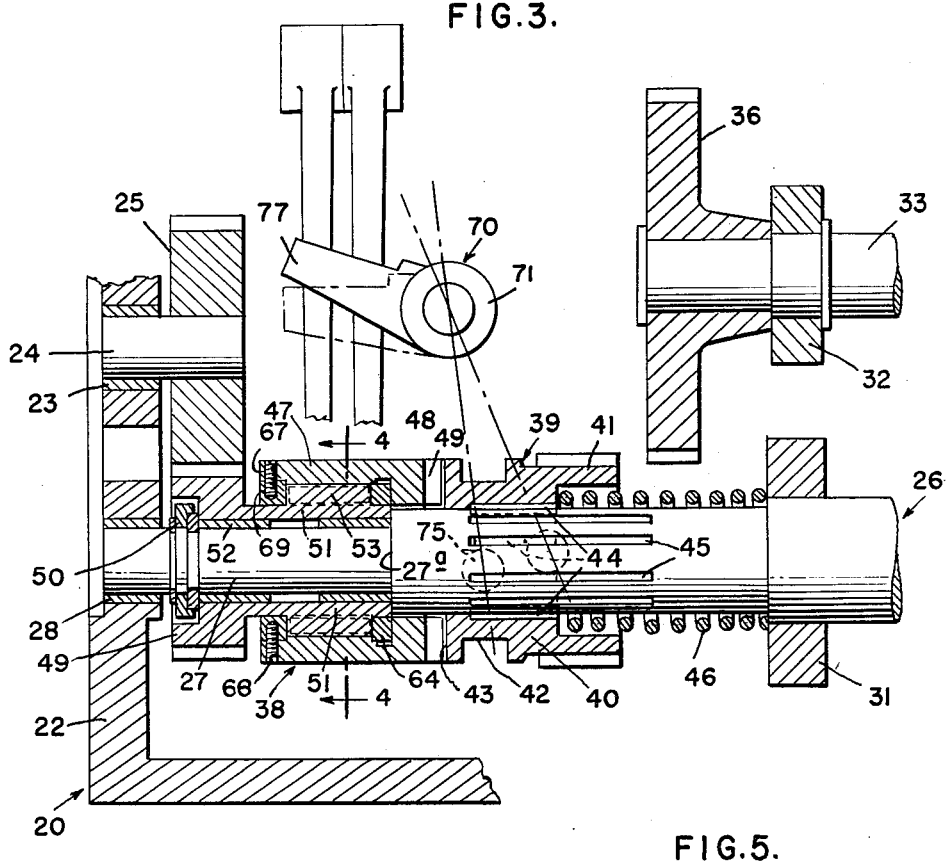
Fig. 3 is a sectional view taken in a vertical plane and on an enlarged scale through the clutch structure and adjacent gears with which it cooperates, certain parts being omitted.

Referring particularly to Fig. 1 of the drawings, it will be seen that the invention is designed primarily to be employed in association with a remotely controlled motor driven valve such as is generally designated by the reference numeral 10. This valve structure 10 includes the casing 12, and an opening and closing valve head such, for example, as gate 14. A yoke 16 is mounted upon the top of the valve casing 12 and adapted to support a drive motor 18 which is attached to the casing 20 wherein is housed the power transmitting train for transmitting power between a motor 18 and the valve stem 21 and the manually operable declutching and valve stem operating mechanism.

A general description will now be given of the operation of the mechanism for actuating the valve stem 21 first automatically by means of the motor 18 and then manually by means of the hereinafter described hand wheel or crank.

The numeral 22 designates a wall of the housing 20 adjacent to the motor 18 and extending through this wall and supported in suitable bearing 23 is the motor shaft 24 upon which is secured the driving gear 25.

The numeral 26 generally designates a worm shaft which forms an element of the power transmitting train between the motor driven gear 25 and the valve stem 21.

One end of the shaft 26 is of reduced diameter as indicated at 27 and this reduced end 27 is rotatably mounted in a bearing 28 supported in the wall 22 as illustrated in Fig. 3. The opposite or outer end of the shaft 26 is suitably rotatably supported in the opposite wall (not shown) of the casing 20.

Within the casing 20, the valve stem 21 carries adjacent to its upper end the worm gear 29 and the shaft 26 is disposed adjacent to the periphery of this gear and carries the worm 30 which meshes with the gear 29 as illustrated in Fig. 2.

Within the casing 20 is suitable means 31 provided for supporting the shaft 26 intermediate its ends, which means may be a division wall as illustrated in my copending application or any other suitable arrangement, and adjacent to this supporting means 31 is a corresponding supporting means 32 in which is rotatably supported the inner end of the hand operable shaft 33, the opposite or outer end of which extends through a suitable bearing in a wall of the casing 20, to the exterior of the latter, to receive the hand crank wheel 35 by which rotation of the valve stem 21 is effected through the mechanism about to be described when the motor drive is disconnected from the worm shaft.

This hand or manually actuated shaft 33 is in spaced parallel relation with the worm shaft 26 and it carries upon its inner end the spur gear 36.

The numeral 37 generally designates the clutch mechanism by means of which actuation of the valve stem 21 may be effected by the motor or by the hand operated wheel 35. This clutch structure broadly comprises the drive element which is generally designated 38 and the driven element which is generally designated 39.

The driven clutch element 39 comprises the sleeve body 40 which is slidably mounted upon the shaft 26 between the support 31 and the reduced portion 27 thereof. This body 40 is formed at the end nearest to the support 31 to provide the pinion gear 41 while, at its opposite end, the body 40 has formed therein the encircling groove 42 for coaction with the clutch shifting fork hereinafter described.

The end of the driven element 39 carries a plurality of clutch teeth or lugs 43 for coaction with corresponding teeth or lugs carried by the drive element 38 as hereinafter set forth.

The driven clutch element 39 is secured to the shaft 26 against rotation thereon by splines 44 slidably engaging in spline grooves 45 formed in and longitudinally of the shaft whereby, when the two clutch elements 38 and 39 are operatively coupled together, rotary motion may be transmitted from the drive motor gear 25 to the shaft in an obvious manner.

Encircling the shaft 26 and interposed between the gear pinion 41 and the stationary body 31 which supports the shaft, is a coil spring 46 which constantly urges movement of the driven clutch element 39 toward the drive element.

The drive element 38 of the clutch structure comprises a cylinder or barrel 47 mounted upon the shaft 26 at the reduced end portion 27 thereof as shown in Fig. 3. This barrel has an inside diameter materially greater than the diameter of the shaft and at the end of the barrel adjacent to the driven clutch element 39 the barrel is formed with the inwardly extending flange 48 which closely encircles the portion of the shaft 26 immediately adjacent to the reduced portion 27. The provision of the reduced portion 27 of the shaft provides an encircling shoulder 27a, the face of which is in the plane of the inside surface of the flange 48.

Carried upon the flanged end of the barrel 47 are clutch teeth or lugs 49 adapted for interengagement with the teeth 43 of the driven element 39.

Mounted upon the reduced portion 27 of the shaft 26 is the motor driven gear 49 which is in constant mesh with the gear 25 supported on the motor shaft 24. This gear 29 is maintained in position by a conventional split lock ring 50.

Formed integral with the gear 49 and comprising a part of the clutch drive element 38 is the elongate hub sleeve 51. This sleeve extends into the adjacent open end of the barrel 47 and has its free end in abutting relation with the shoulder 27a of the shaft.

The gear 49 and hub sleeve formed integral therewith have interposed between them and the reduced portion 27 of the shaft the sleeve bearings 52.

Formed integral with the hub sleeve 51 are a number of longitudinally extending spacer ribs 53 which, as is clearly shown in Figs. 3 and 6, are of materially less length than the hub sleeve and they terminate short of the free end of the sleeve as is clearly shown in Figs. 3 and 6.

The barrel 47 is internally formed to provide a number of longitudinally extending grooves 54 corresponding in number to the spacer ribs 53. Between these grooves are formed the longitudinally extending lands 55 which at the forward or flanged end of the barrel merge with the flange 48 but which terminate short of the opposite or open end of the barrel thereby forming the circular recess 56.

Figures 4, 5:
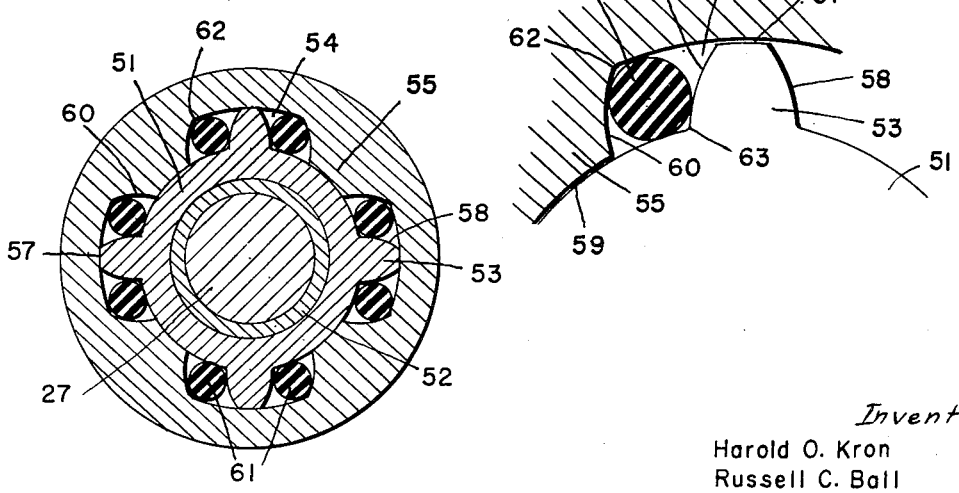
Fig. 4 is a transverse section taken substantially on the line 4—4 of Fig. 3.
Fig. 5 is a detailed view on an enlarged scale illustrating more specifically the form of the opposing surfaces of a spacer rib and land between which a resilient roll or cylinder is positioned.

As shown in Fig. 4, the width of each groove 54 is materially greater than the thickness or width of a spacer rib 53 which is located therein and, as is also shown in this figure, each groove 54 has a spacer rib therein and the outer longitudinal face 57 of each rib is in close proximity to the bottom of the groove. The side faces of the ribs 53 are curved or arcuate as indicated at 58, converging outwardly toward the radial face 57 of the rib so that, as shown, the ribs are of greater width at the root than at the outer extremity or tip, corresponding, as previously stated, to the form or contour of a spur gear.

The height of the lands substantially corresponds to that of the ribs 53 and the inner faces of the lands are transversely concave as at 59 to conform to the curvature of the opposing surface of the hub sleeve which said faces closely approach as shown in Fig. 5.

The opposite sides of each land 55 are curved to have a concave form transversely as indicated at 60, the two curved side faces of each land being thus inwardly convergent, as shown, whereby each land, like each of the ribs, is of greater width at its base than at its inner portion across the face 59.

Since the overall width of each rib is materially less than the width of the groove in which it is located, it will be seen that when the rib is at the center of the groove a space is provided at each side of the rib and in each of the spaces is located a roll or cylinder 61 of resilient material such as rubber, preference being had for the synthetic rubber neoprene. Each of these cylinders or rolls 61 is of a diameter to snugly fit in the angles 62 and 63 which are formed respectively between the surfaces 60 and the bottoms of the groove and between the surfaces 58 of the ribs and the adjoining or intersecting surface of the hub sleeve. Thus each resilient roll or cylinder 61 is maintained in contact at all times with the bottom of the groove and the adjacent face of a land and with the side of a rib and the adjacent surface of the hub sleeve so that free relative movement between the barrel 47 and the hub sleeve is prevented.

The resilient rolls or cylinders 61 are of approximately the same length as the spacer ribs 53 and at the inner edge of each groove 54 there is located an arcuate filler block 64 which lies between two adjacent lands 55 and extends across the ends of the adjacent pair of resilient rolls and the spacer rib interposed between them.

At the open or outer end of the barrel, the inner wall is provided with a shallow channel 65 and lying in this channel and closely encircling the hub sleeve 51 is a two-part ring 66, the inner side of which lies against or in close proximity to the ends of the lands 55.

The barrel is provided with a pair of threaded apertures extending radially therethrough into the channel 65 as indicated at 67 in which are received set screws 68 which engage in threaded apertures 69 in the two halves of the ring 66 as illustrated in Fig. 3 and Fig. 7.

The numeral 70 generally designates the clutch shifting unit. This unit comprises an elongate head 71 which is here shown as being in part in the form of a cylinder which is disposed above and transversely of the clutch unit. Opposite ends of the head 71 carry the axially extending supporting trunnions 72 which are mounted in a suitable manner in the casing whereby the clutch unit may swing on an axis extending transversely of the worm shaft 26 for effecting the desired sliding movement of the driven element of the clutch. As stated, any suitable means may be provided for suspending the clutch shifting unit 70 such, for example, as the bearings illustrated in the casing in the copending application of Harold O. Kron hereinbefore referred to.

Connected to the underside of the head 71 is a shifting fork 73 which comprises the two spaced parallel arms 74 which extend downwardly on opposite sides of the driven element 39 of the clutch unit and each of these arms carries the inwardly extending pin 75 which is loosely engaged in the circular slot or channel 42 forming a part of the sleeve body 40.

Formed integral with the head 71 intermediate the ends thereof on the side adjacent to the gear 36, is a shifting pin 76 which is substantially perpendicular to the turning axis of the head 71 and is directed toward the hand actuatable gear 36 as shown in Fig. 2.

At the opposite side of the head 71 from the pin 76 there extends a latching tongue 77 having a straight edge 78 along one side for the purpose hereinafter set forth.

The manual operator for the clutch yoke is generally designated 79. This actuator includes the declutching shaft 80 which is supported in a suitable manner for turning on an axis in spaced parallel relation with the worm shaft 26. The means for supporting this declutching shaft 80 may be the same as that illustrated in the copending application of Harold O. Kron and, accordingly, no illustration is here given of the supporting means for this shaft.

The shaft 80 at one end extends through the side of the casing 20, in which it is rotatably supported, and terminates, as shown in Fig. 1, adjacent to the hand wheel 35 on the outside of the casing 20 and upon this outer end the shaft 80 carries the hand lever 81 by which the turning of the shaft may be manually effected.

At its inner end, the declutching shaft carries a fork 82 in which is loosely engaged the free end of the pin 76 as illustrated in Figs. 2 and 9 whereby upon turning of the shaft 80, desired locking movement may be imparted to the clutch shifting unit 70 as will be readily apparent.

The locking and unlocking means for automatically releasably maintaining the mechanism in its declutching relationship is generally designated 83. This means includes a pair of elongate spring-loaded latching levers 84 and 85 which are suspended by a suitable pivot pin or shaft 86 to extend down on one side of the worm shaft and the clutch unit as illustrated in Fig. 2 and to extend across the edge 78 of the yoke carried tongue 77.

Any suitable means may be provided in the casing 20 of the mechanism for supporting the pivot pin or shaft on which the latching levers 84 and 85 are mounted, such as the means illustrated in my copending application.

The levers 84 and 85 are formed respectively with notch forming shoulders 87 and 88, the shoulder 87 of the lever 84 being slightly below the plane of the shoulder 88.

A pair of plungers 89 and 90 are suitably supported by the casing for reciprocable movement and for engagement respectively against the outer sides of the levers 84 and 85 and these plungers are normally urged inwardly to constantly urge the levers to swing toward the adjacent barrel of the drive element of the clutch unit by springs 91. By means of these spring pressed plungers, the levers are maintained constantly in engagement with the adjacent side of the tongue 77 and when the yoke unit 70 has been oscillated in a direction to disengage the driven element of the clutch from the drive element, the tongue 77 will be swung downwardly and the edge 78 thereof will be engaged under the shoulders 87 and 88, the spring plungers 89 and 90 maintaining the levers in this tongue engaging position.

The clutch barrel 47 carries upon its outer surface a pair of lugs or projections 92 and 93 for engagement respectively with the free ends of the levers 84 and 85 which extend downwardly across the side of the barrel 47 as illustrated to effect successive outward swinging of the levers upon actuation of the motor drive to release the yoke and bring about the motor drive coupling of the clutch driven element 39 with the worm shaft 26.

When the parts of the mechanism are set for manual rotation of the valve stem 21, the shoulder 87 of the lever 84 which is slightly lower than the shoulder 88 of the lever 85, engages the edge 78 of the holding tongue 77 against the pressure of the spring pressed plunger 89 while the shoulder 88 is disposed in slightly spaced relation to the edge 78. As soon as power drive is switched on, the locking levers 84 and 85 are successively pushed out or back by the cams or lugs 92 and 93, respectively, and held in retracted or outwardly swung position by the tongue 77. If the first engagement to occur is between the cam 92 and lever 84, the tongue 77 is still held down by the shoulder 88 until after 180° of rotation of the driven clutch element 38, at which time the cam or lug 93 engages the lower end of the lever 85 to force it outwardly and release the tongue 77 to establish power drive by the spring shifting of the driven element 39 of the clutch inwardly toward and into engagement with the drive element 38. If the first engagement to occur is between the cam 93 and the lever 85, the lever 85 will return to its original position after contact by the cam until the lever 84 has been swung outwardly for disengagement from the tongue 77 and the additional 180° of rotation has occurred. It is, therefore, immaterial, in the change from hand to power operation, which of the two cams 92 and 93 happens to be in position to push back its respective locking lever first. Furthermore, the construction of the levers and their relationship with the cams is such that the direction of rotation of the drive clutch element is immaterial.

Fig. 8 illustrates the manner of assembling the parts of the drive unit of the clutch structure.

In assembling these parts, the bushings 52 are first inserted into the hub 51 of the gear 49. Next the spacers or fillers blocks 64 for the grooves 54 are put into the barrel and while being held in position therein the hub sleeve 51 is slid about half-way into the barrel.

The rubber cylinders or inserts 61 are then introduced into the barrel one on either side of a spacer rib or spline 53 after which the split ring 66 is placed around the hub sleeve and introduced into the channel 65 in the open end of the barrel 47 and locked in position by the set screws 68. In this assembly, care must be taken to see that the ring 66 does not bind on the hub sleeve 51. This assembly of the drive element of the clutch structure may be made directly on the shaft as illustrated in Fig. 8 or separately and then applied to the shaft as will be readily obvious.

*Operation*

The normal setting of the parts of the mechanism for motor operation of the valve control is as illustrated in Figs. 2 and 3 where it will be seen that the clutch shifting unit 70, referring particularly to Fig. 2, is in a position in which the pin 76 is down and the tongue 77 is elevated above the stop shoulders 87 and 88 of the adjacent levers 84 and 85. The clutch teeth will then be intermeshed as shown. Upon actuation of the motor 18, the gear 25 drives the gear 29 which tends to turn the hub sleeve 51 in the barrel 47. Turning movement is thus transmitted to the barrel through the rubber rolls or cylinders interposed between the spacer ribs or splines 53 and the opposing faces 60 of the lands 55. Since the driven reciprocable clutch element 39 is splined to the worm shaft 26, the shaft rotates and the worm 30 thereon drives the worm gear 29 through which the valve stem 21 extends, whereby the gate valve may be raised (opened) or lowered (closed) depending upon the direction of rotation of the motor.

If, for any reason, it is desired that the valve stem be hand turned for the operation of the valve instead of being driven by the motor, this operation is accomplished in the following manner. The declutching lever 81 is first depressed or swung downwardly from the position in which it is illustrated in Fig. 1 and due to the balanced condition of the yoke unit 7, the yoke is rocked from a clutching position as shown in Fig. 2 to declutching position as illustrated in Fig. 9 with very little exertion since the spring 46 is not heavy enough to resist this action with any great degree of force. The yoke will swing to a position where the driven clutch element is disengaged from the driving element and the edge or side face 78 of the tongue 77 will swing down to a position below the shoulders 87 and 88 carried by the levers 84 and 85. The springs 91 then cause the levers to swing inwardly so that the edge of the tongue will engage against the under faces of these shoulders. The driven element 39 of the clutch will now be held in declutched position by the latching levers 84 and 85 and the gear 41 will have been shifted into toothed connection with the hand operable gear 36 as shown in Fig. 9. Hand operation of the valve can then be had by rotating the gear 36 by means of the hand wheel 35, the manual power being delivered through the pinion 41, which is splined on the shaft 26, through the shaft to the worm 30 and from the worm to the worm wheel 29 to the valve stem 21.

In order to have automatic motor driving of the valve stem upon energization of the motor and at the same time avoid having the hand operator injured the camming lugs 92 and 93 are arranged to successively or sequentially engage the adjacent latching levers 84 and 85 to effect outward movement of the lever upon energization of the motor to permit return swinging of the yoke unit and movement of the driven clutch element to motor drive clutching position, at the same time disconnecting the hand drive from the worm shaft 26. It will be appreciated that energization of the motor during hand operation will not effect rotation of the worm shaft until after disconnection of the hand drive by the aforesaid automatically operable means, since the driving clutch element 38 and motor driven gear 49 are otherwise rotatable freely on the worm shaft 26.

When the driving motor becomes energized while the mechanism is in set position for hand operation, as soon as the cam lugs 92 and 93 effect the outward swinging of the levers 84 and 85 to release the tongue 77 of the clutch unit, the spring 46 will exert its force to slide the shiftable driven clutch element 39 toward the drive element 38 so as to effect interlocking of the clutch teeth 43 and 49. Since the element 38 will be rotating at high speed when this changeover occurs and the element 39 will not be rotating, it will be seen that when the clutch teeth engage the noise and shock incident to such engagement will be absorbed by the yieldable rubber rolls or inserts 61 as the spacer ribs or splines 53 are driven each against a roll 61 at one side thereof thus compressing the roll between a side face of each rib and the adjacent face 60 of a land 55. By reason of the curved relation of the opposing surfaces 58 and 60 between which a rubber insert is compressed, it will be seen that room is provided for considerable deformation of the resilient insert so that slight relative movement occurs between the gear hub sleeve 51 and the barrel 47 in which the sleeve is housed. This permits or effects a smooth speed-up action between the motor driven hub sleeve and the resisting barrel so that there is acceleration imparted to the movement of the barrel and of the driven clutch unit from the hub sleeve 51 instead of a violent driving of the barrel and driven clutch element, as well as the worm shaft and parts connected therewith, from substantially a standstill to a full speed. This avoids the transmission of shocks to the parts which have to be started up, which might result in breakage or deformation, and at the same time reduces noise to a considerable extent.

In connection with the electrical features associated with the starting and stopping of the motor drive reference is made to the hereinbefore referred to Ball patent for a complete description of the limit switches and mode of operation when applied to valve operating assemblies. As pointed out in that patent, when the valve reaches the end of either its opening or closing movement, a limit switch is operated to stop the motor drive and also to provide for reverse operation of the motor when it is next operated.

From the foregoing, it will be apparent that there is provided by the present invention a new and novel combination of valve control mechanism and clutching mechanism for effecting a smooth, shockless and noise reducing or eliminating starting of the valve actuation by motor drive either when the clutch elements are already engaged or, more particularly, when change-over is automatically effected from manual operation to motor operation.

We claim:

1. In combination, in a dual means for operating a valve, a motor drive, a worm gear whose rotation effects opening and closing movement of the valve stem, a shaft carrying a worm coacting with the worm gear for effecting rotation of the valve stem, a train of power transmitting units between the motor drive and the shaft having as one of its units a clutch including a driving element and a driven element carried on the worm shaft, means coupling the driven element with the worm shaft for axially shiftable non-rotational movement thereon, a hand actuatable mechanism including a rotatable shaft adjacent to the worm shaft and carrying a shaft and a means for effecting manual rotation, a gear slidably mounted on the worm shaft and operatively coupled with the driven clutch element to turn and shift therewith, spring means constantly urging the driven clutch element and the slidably mounted gear coupled therewith to a clutching relation with said drive element and a disconnected relation with the gear on the hand wheel shaft, means operable to effect declutching to interrupt the motor drive connection with the worm shaft and to effect movement of the slidably mounted gear into operative engagement with the gear on the hand wheel shaft for hand operation of the valve, and means forming a yielding coupling between the driving element and the motor drive.

2. In combination, in a dual means for operating a valve, a motor drive, a gear whose rotation effects opening and closing movement of the valve stem, a shaft carrying a gear coacting with the first gear for effecting rotation of the valve stem, a train of power transmitting units between the motor drive and the shaft having as one of its units a clutch including a driving element and a driven element carried on the shaft, means coupling the driven element with the shaft for axially shiftable non-rotational movement thereon, a hand actuatable mechanism including a gear, a gear integral with the clutch driven element for rotation and axial movement therewith, means for axially shifting the clutch driven element to non-clutching position relative to the drive element and to a position in which said last mentioned gears are in toothed connection, spring means urging movement of the clutch driving element to clutch engaged position, means for latching said clutch driven element in said non-clutching position, means for releasing said latching means upon the starting of the motor drive to permit said spring means to shift the driven element to clutching position, and means forming a shock absorbing and noise deadening coupling between the clutch driving element and the motor drive.

3. In combination, in a dual means for operating a valve having a stem, a gear on the stem, a shaft, a gear on the shaft in driving connection with the first gear, a motor drive means including a driving gear, a manual drive means including a shaft adjacent to the first shaft, a gear on the second shaft and means for manually rotating the latter, mechanism for electively coupling the motor drive means and the manual drive means with the first shaft comprising a clutch structure including a drive element and a driven element carried on the first shaft, means coupling the driven element with the shaft for axially shiftable non-rotational movement thereon, a shiftable gear carried by the driven element for engagement with the gear on the second shaft upon movement of the driven element to a predetermined non-clutching position, spring means for urging the driven element into clutching position, means for moving the driven element and shiftable gear to said predetermined non-clutching position, means for releasably latching the driven element in said predetermined non-clutching position, said clutch drive element including two resiliently interconnected parts adapted for free rotation on the first shaft, a driving connection between one of said interconnected parts and the motor driving gear, the other of said parts being adapted for engagement by the driven element, and means for releasing the latching means upon operation of the motor drive means.

4. The invention according to claim 3, wherein the resilient interconnection between said clutch parts comprises opposite rigid members and resilient members separating the opposing members.

5. The invention according to claim 3, wherein the resilient interconnection between said clutch parts comprises elongate rigid members carried by said parts extending parallel to the rotary axis of the clutch, said members being in spaced intermeshed relation, and resilient elements disposed in the spaces between the members.

6. The invention according to claim 5, wherein said resilient elements are in the form of cylinders disposed longitudinally beside the rigid members.

7. The invention according to claim 3, wherein the said one of the two parts of the clutch drive element comprises a gear having an elongate hub sleeve, the said other of said parts, comprising a barrel into which said hub sleeve extends, the barrel having internal longitudinally extending grooves separated by longitudinal lands, the hub sleeve having longitudinally extending ribs each disposed between and spaced from a pair of lands, and said resilient interconnection comprising elongate resilient bodies on opposite sides of each rib in the space between the same and a land.

8. The invention according to claim 7, wherein each of said bodies is in the form of a solid cylinder of rubber.

9. The invention according to claim 7, wherein said lands have radially inwardly directed faces transversely curved to substantially conform to the curvature of the opposing shaft surface.

10. The invention according to claim 7, wherein said lands have radially inwardly directed faces transversely curved to substantially conform to the curvature of the opposing shaft surface, the said ribs having curved side faces in radially outwardly convergent relation and said lands having transversely concave side faces curving in substantially the same direction as the opposing rib side face, and the said resilient bodies being in the form of cylinders of a diameter to fit snugly between the opposing rib and land faces.

References Cited in the file of this patent

UNITED STATES PATENTS 2,621,543    Rossman _____ Dec. 16, 1952